(12) United States Patent
Kurth et al.

(10) Patent No.: US 10,316,192 B2
(45) Date of Patent: Jun. 11, 2019

(54) EMULSIONS WITH POLYMERIZED OILS AND METHODS OF MANUFACTURING THE SAME

(71) Applicant: Cargill, Incorporated, Wayzata, MN (US)

(72) Inventors: Todd L. Kurth, Maple Grove, MN (US); Scott Nivens, Minneapolis, MN (US); Christopher Patrick Stevermer, St. Louis Park, MN (US); Hassan Ali Tabatabaee, Plymouth, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 15/715,741

(22) Filed: Sep. 26, 2017

(65) Prior Publication Data
US 2019/0092945 A1 Mar. 28, 2019

Related U.S. Application Data

(62) Division of application No. 15/553,665, filed on Aug. 25, 2017.

(51) Int. Cl.
| C08L 95/00 | (2006.01) |
| C08L 91/00 | (2006.01) |
| E01C 7/26 | (2006.01) |
| C09D 195/00 | (2006.01) |

(52) U.S. Cl.
CPC ............ *C08L 95/005* (2013.01); *C08L 91/00* (2013.01); *C09D 195/00* (2013.01); *E01C 7/262* (2013.01); *C08L 2555/28* (2013.01)

(58) Field of Classification Search
CPC .......... C08L 75/00; C08L 91/00; C08L 95/00; C08L 2555/28; C09D 195/00; C10C 3/00; C11B 3/00; C11B 3/08; C11C 3/00; C11C 3/006; E01C 7/00; E01C 7/262
See application file for complete search history.

(56) References Cited

U.S. PATENT DOCUMENTS

| 2,750,298 A | 6/1956 | Euchner et al. |
| 2,815,296 A | 12/1957 | Young et al. |
| 2,817,653 A | 12/1957 | Cole et al. |
| 3,595,820 A | 7/1971 | Herder et al. |
| 4,226,552 A | 10/1980 | Moench |
| 4,740,322 A | 4/1988 | Di et al. |
| 6,117,227 A | 9/2000 | Kitagawa |
| 6,133,351 A | 10/2000 | Hayner |
| 6,956,071 B2 | 10/2005 | Butler |
| 6,987,207 B1 | 1/2006 | Ronyak |
| 7,951,417 B1 | 5/2011 | Wen et al. |
| 8,765,985 B2 | 7/2014 | Lochel et al. |
| 8,821,064 B1 | 9/2014 | Morris et al. |
| 2008/0314294 A1 | 12/2008 | White et al. |
| 2010/0034586 A1 | 2/2010 | Bailey et al. |
| 2010/0261805 A1 | 10/2010 | Abraham et al. |
| 2011/0003727 A1 | 1/2011 | Bloom et al. |
| 2012/0065417 A1 | 3/2012 | Hora et al. |
| 2012/0315088 A1 | 12/2012 | Deneuvillers et al. |
| 2013/0184383 A1 | 7/2013 | Cochran et al. |
| 2014/0083328 A1 | 3/2014 | Lochel, Jr. et al. |
| 2014/0261076 A1 | 9/2014 | Quinn et al. |
| 2014/0338565 A1 | 11/2014 | Broere et al. |
| 2014/0343192 A1 | 11/2014 | Cochran et al. |

FOREIGN PATENT DOCUMENTS

| CA | 2315955 A1 | 2/2002 | |
| CA | 2571214 A | 2/2006 | |
| EP | 0712834 A1 | 5/1996 | |
| GB | 2462371 A | 2/2010 | |
| WO | WO-2009137298 A1 * | 11/2009 | .......... C10M 129/70 |
| WO | 2010016127 A1 | 2/2010 | |
| WO | 2010077141 A1 | 7/2010 | |
| WO | WO-2012166414 A1 * | 12/2012 | ............ C09J 103/02 |
| WO | 2013090283 A1 | 6/2013 | |
| WO | WO-2013163463 A1 * | 10/2013 | .............. C08L 91/00 |
| WO | 2015138958 A1 | 9/2015 | |

* cited by examiner

Primary Examiner — Jennifer A Smith
Assistant Examiner — Alexandra M Moore

(57) ABSTRACT

Described herein is an emulsion for use in asphalt rejuvenation applications, comprising an oil phase comprising (1) a polymerized oil comprising a polymeric distribution having about 2 to about 80 wt % oligomer content, a polydispersity index ranging from about 1.0 to about 5.0, and sulfur content less than about 8 wt %; and (2) an aqueous phase, comprising a surfactant. The emulsion may be incorporated into asphalt paving, roofing, and coating applications and especially aged or recycled asphalt thereby obtaining rejuvenated asphalt.

25 Claims, No Drawings

EMULSIONS WITH POLYMERIZED OILS AND METHODS OF MANUFACTURING THE SAME

CROSS-REFERENCE TO RELATED APPLICATION

This application is a Divisional of U.S. patent application Ser. No. 15/553,665, filed Aug. 25, 2017, entitled "EMULSIONS WITH POLYMERIZED OILS & METHODS OF MANUFACTURING THE SAME", which is a national phase application of International Application PCT/US16/019777, filed Feb. 26, 2016, entitled "EMULSIONS WITH POLYMERIZED OILS & METHODS OF MANUFACTURING THE SAME", which claims the benefit of U.S. Provisional Patent Application, Ser. No. 62/126,064, filed Feb. 27, 2015, entitled "POLYMERIZED OILS & METHODS OF MANUFACTURING THE SAME", which is hereby incorporated by reference in its entirety.

TECHNICAL FIELD

This disclosure relates to emulsions comprising polymerized oils and blending said emulsions with asphalt to enhance performance of virgin asphalt and/or pavements containing recycled and aged bituminous material.

BACKGROUND

Recent technical challenges facing the asphalt industry have created opportunities for the introduction of agriculture-based products for the overall performance enhancement of asphalt. Such performance enhancement may include expanding the useful temperature interval (UTI) of asphalt, rejuvenating aged asphalt, and compatibilizing the various chemical fractions in asphalt with each other as well as with other additives such as elastomeric thermoplastic polymers in asphalt.

SUMMARY

Described herein is an emulsion for use in asphalt rejuvenation applications, comprising an oil phase comprising (1) a polymerized oil comprising a polymeric distribution having about 2 to about 80 wt % oligomer content, a polydispersity index ranging from about 1.0 to about 5.0, and sulfur content less than about 8 wt %; and (2) an aqueous phase, comprising a surfactant. The emulsion may be incorporated into asphalt paving, roofing, and coating applications and especially aged or recycled asphalt thereby obtaining rejuvenated asphalt.

DETAILED DESCRIPTION

"Flash Point" or "Flash Point Temperature" is a measure of the minimum temperature at which a material will initially flash with a brief flame. It is measured according to the method of ASTM D-92 using a Cleveland Open Cup and is reported in degrees Celsius (°C.).

"Oligomer" is defined as a polymer having a number average molecular weight (Mn) larger than 1000. A monomer makes up everything else and includes monoacylglycerides (MAG), diacylglycerides (DAG), triacylglycerides (TAG), and free fatty acids (FFA).

"Performance Grade" (PG) is defined as the temperature interval for which a specific asphalt product is designed. For example, an asphalt product designed to accommodate a high temperature of 64° C. and a low temperature of −22° C. has a PG of 64-22. Performance Grade standards are set by the American Association of State Highway and Transportation Officials (AASHTO) and the American Society for Testing Materials (ASTM).

"Polydispersity Index" (also known as "Molecular Weight Distribution") is the ratio of weight average molecular weight (Mw) to number average molecular weight (Mn). The polydispersity data is collected using a Gel Permeation Chromatography instrument equipped with a Waters 510 pump and a 410 differential refractometer. Samples are prepared at an approximate 2% concentration in a THF solvent. A flow rate of 1 ml/minute and a temperature of 35° C. are used. The columns consist of a Phenogel 5 micron linear/mixed Guard column, and 300×7.8 mm Phenogel 5 micron columns (styrene-divinylbenzene copolymer) at 50, 100, 1000, and 10000 Angstroms. Molecular weights were determined using the following standards:

| Standard | Monoolein | Diolein | Arcol LHT 240 | Triolein | Epoxidized Soybean Oil | Acclaim 2200 | Multranol 3400 | Acclaim 8200 |
| --- | --- | --- | --- | --- | --- | --- | --- | --- |
| Molecular Weight (Daltons) | 356 | 620 | 707 | 878 | 950 | 2000 | 3000 | 8000 |

"Useful Temperature Interval" (UTI) is defined as the interval between the highest temperature and lowest temperature for which a specific asphalt product is designed. For example, an asphalt product designed to accommodate a high temperature of 64° C. and a low temperature of −22° C. has a UTI of 86. For road paving applications, the seasonal and geographic extremes of temperature will determine the UTI for which an asphalt product must be designed. UTI of asphalt is determined by a series of AASHTO and ASTM standard tests developed by the Strategic Highway Research Program (SHRP) also known as the "Performance Grading" (PG) specification.

Asphalt and Bituminous Materials

For the purpose of this invention asphalt, asphalt binder, and bitumen refer to the binder phase of an asphalt pavement, roofing, coatings or other industrial applications. Bituminous material may refer to a blend of asphalt binder and other material such as mineral aggregate or filler. The binder used in this invention may be material acquired from asphalt producing refineries, flux, refinery vacuum tower bottoms, pitch, and other residues of processing of vacuum tower bottoms, as well as oxidized and aged asphalt from recycled bituminous material such as reclaimed asphalt pavement (RAP), and recycled asphalt shingles (RAS) or in the surface layer of existing pavements.

For the purpose of this invention, emulsion is defined as a multiphase material in which all phases are dispersed in a continuous aqueous phase. The aqueous phase may be comprised of surfactants, acid, base, thickeners, and other additives. The dispersed phase may comprise of the polymerized oil. thermoplastic natural and synthetic polymers, waxes, asphalt, and other additives and oils, herein collectively referred to as the "oil phase". High shear and energy is often necessary to disperse the oil phase in the aqueous phase using apparatus such as colloidal mills.

Starting Oil Material

Biorenewable oils may be used as the starting oil material. Biorenewable oils can include oils isolated from plants, animals, and algae.

Examples of plant-based oils may include but are not limited to soybean oil, linseed oil, canola oil, rapeseed oil, castor oil, tall oil, cottonseed oil, sunflower oil, palm oil, peanut oil, safflower oil, corn oil, corn stillage oil, lecithin (phospholipids) and combinations, distillates, derivatives, and crude streams thereof.

Examples of animal-baaed oils may include but are not limited to animal fat (e.g., lard, tallow) and lecithin (phospholipids), and combinations, distillates, derivatives, and crude streams thereof.

Biorenewable oils can also include partially hydrogenated oils, oils with conjugated bonds, and bodied oils wherein a heteroatom is not introduced, for example but not limited to, diacylglycerides, monoacylglycerides, free fatty acids (and distillate streams thereof), alkyl esters of fatty acids (e.g., methyl, ethyl, propyl, and butyl esters), diol and triol esters (e.g., ethylene glycol, propylene glycol, butylene glycol, trimethylolpropane), and mixtures and derivative streams thereof. An example of biorenewable oils may be waste cooking oil or other used oils.

Previously modified or functionalized oils may also be used as the starting oil material. Examples of previously modified oils are those that have been previously vulcanized or polymerized by other polymerizing technologies, such as maleic anhydride or acrylic acid modified, hydrogenated, dicyclopentadiene modified, conjugated via reaction with iodine, interesterified, or processed to modify acid value, hydroxyl number, or other properties. Some examples of previously modified oils are polyol esters, for example polyglycerol ester or a castor oil ester, or estolides. Such modified oils can be blended with unmodified plant-based oils or animal-based oils, fatty acids, glycerin, and/or lecithin. Examples of functionalized oils are those wherein a heteroatom (oxygen, nitrogen, sulfur, and phosphorus) has been introduced.

In preferred aspects, the starting oil material is recovered corn oil (typically residual liquids resulting from the manufacturing process of turning corn into ethanol) (also known as "corn stillage oil") or other low cost waste oils. In another preferred aspect, the starting oil material comprises free fatty acids. One skilled in the art will recognize that if higher functionality is desired, plant-based oils having higher levels of unsaturation may be used.

Sulfur Crosslinking of the Oil

In the various aspects, polymerization of the biorenewable, previously modified, or fictionalized oil is achieved through crosslinking of the fatty acid chains and/or the glyceride fraction of the tri-glyceride molecules contained in the biorenewable, previously modified, or functionalized oil utilizing a sulfur-containing compound. The sulfur in the sulfur-containing compound is preferably in a reduced form. The polymerization method comprises the steps of (a) heating a biorenewable, previously modified, or functionalized oil (b) adding a sulfur-containing compound to the heated oil, and (c) allowing the sulfur-containing compound to react with the oil to produce a polymerized oil with a desired polymeric distribution (having about 2 wt % to about 80 wt % oligomer content), polydispersity index (from about 1.0 to about 5.0), and sulfur content (between about 0.01 wt % and about 8 wt %).

In a first step, the biorenewable. previously modified, or functionalized oil is heated in a vessel equipped with an agitator to at least 100° C. In more preferred aspects, the biorenewable, previously modified, or functionalized oil (may also be collectively referred to herein as the "oil") is heated to at least 115° C. In preferred aspects, the sulfur-containing compound is gradually added to the heated biorenewable. previously modified, or functionalized oil and may be added in either a solid or a molien form, however it shall be understood that the sulfur-containing compound may be added before the oil or simultaneously with the oil. In preferable aspects, the sulfur-containing may be elemental sulfur, but is not limited to such. The reaction between the sulfur and oil inherently increases the temperature of the oil-sulfur mixture and in preferred aspects, the reaction is held at temperatures between about 130° C. and about 250° C., more preferably between about 130° C. and about 220° C., and even more preferably between about 160° C. and about 200° C. during the course of the reaction.

The oil-sulfur mixture may be continuously sparged with a gas-containing stream during the polymerization reaction between the oil and the sulfur. The gas-containing stream may be selected from the group consisting of nitrogen, air, and other gases. The gas-containing stream may help facilitate the reaction and may also assist in reducing odors ($H_2S$ and other sulfides) associated with the reaction. Use of air can be of additional use, as it may lead to oxi-polymerization of the oil in addition to the sulfurization process.

Optionally, accelerators may be used to increase the rate of the reaction. Examples of accelerators include, but are not limited to, zinc oxide, magnesium oxide, dithiocarbamates.

The reaction may continue and may be continuously monitored using gel permeation chromatography (GPC) and/or viscosity until the desired degree of polymerization is achieved as discussed below.

The robustness of the sulfur crosslinking reaction and the ability to use it for the polymerization of lower cost feedstocks containing high free fatty acid content and residual moisture is an advantage of this polymerization method compared to other processes, providing flexibility in starting material selection.

Polymerization Characteristics

The reaction between the sulfur-containing compound and the biorenewable, previously modified, or functionalized oil is driven until a polymeric distribution having between about 2 wt % and about 80 wt % oligomers (20 wt % to 98 wt % monomers), and more preferably between about 15 wt % to about 60 wt % oligomers (40 wt % to 85 wt % monomers), and even more preferably between about 20 wt % to about 60 wt % oligomers (40 wt % to 80 wt % monomers) is achieved. In even more preferred aspects, the polymeric distribution ranges from about 50 wt % to about 75 wt % oligomers and about 25 wt % to about 50 wt % monomers.

The polydispersity index of the polymerized oil ranges from about 1.0 to 5.0, more preferably 1.30 to about 2.20, and evert more- preferably from about 1.50 to about 2.05.

A benefit of the reaction described herein is the low sulfur content in the resulting polymerized oil. In some aspects, the sulfur content makes up less than 8 wt % of the polymerized oil. In other aspects, the sulfur content makes up less than 6 wt % of the polymerized oil. In yet other aspects, the sulfur content makes up less than 4 wt % of the polymerized oil. And in other aspects, the sulfur content makes up leas than 2 wt % of the polymerized oil. The sulfur content, however, comprises at least 0.001 wt % of the polymerized oil.

The flash point of the resulting polymerized oil, as measured using the Cleveland Open Cup method, is at least about 100° C. and no more than about 400° C. In some aspects, the flash point of the polymerized oil is between about 200° C. and about 350° C. In other aspects, the flash point of the polymerized oil is between about 220° C. and about 300° C. In yet other aspects, the flash point of the polymerized oil is between about 245° C. end about 275° C. The polymerized oils described herein may have higher flash point than its starting oil material, especially when compared against other polymerization technique.

The viscosity of the polymerized oil will vary based on the type of starting oil material, but generally ranges from about 1 cSt to about 100 cSt at 100° C.

End-Use Applications

In one aspect, the present invention provides a modified asphalt comprising a blend of 60 wt % to 99.9 wt % of asphalt binder and 0.1 wt % to 40 wt % of the polymerized oil, and a method for making the same, in which polymerization of the oil is achieved through sulfur cross-linking as described above. The modified asphalt may be used for road paving, roofing, coating, and other industrial applications.

In another aspect, the present invention provides a modified asphalt comprising a blend of 60 wt % to 99.9 wt % asphalt binder and 0.1 wt % to 40 wt % of the polymerized oil, and a method for making the same, wherein the polymerized oil is a blend of an polymerized oil achieved through sulfur cross-linking, as described above, and one or more of the biorenewable, previously modified or functionalized oils described above, for example: modified or unmodified plant-based oil, animal-based oil, fatty acids, fatty acid methyl esters, gums or lecithin, and gums or lecithin in modified oil or other oil or fatty acid.

Other components, in addition to the polymerized oil, may be combined with an asphalt binder to produce a modified asphalt, for example but not limited to, thermoplastic elastomeric and plastomeric polymers (styrene-butadiene-styrene, ethylene vinyl-acetate, functionalized polyolefins, etc.), polyphosphoric acid, anti-stripping additives (amine-based, phosphate-based, etc.), warm mix additives, emulsifiers and/or fibers. Typically, these components are added to the asphalt binder/polymerized oil at doses ranging from about 0.1 wt % to about 10 wt %.

Asphalt Modification

The declining quality of bitumen drives the need for adding chemical modifiers to enhance the quality of asphalt products. Heavy mineral oils from petroleum refining are the most commonly used modifiers. These mineral oils extend the low temperature limit of the asphalt product by 'plasticizing' the binder, however this also tends to lower the upper temperature limit of the asphalt.

Mineral flux oils, petroleum-based crude distillates, and re-refined mineral oils have been used in attempts to soften the asphalt. Often, use of such material results in a decrease of the high temperature modulus of asphalt more than the low temperature, making the asphalt more prone of rutting at high temperatures. Such effects result in the reduction of the Useful Temperature Interval (UTI).

Mineral flux oils, petroleum-based crude distillates, and re-refined mineral oils often have volatile fractions at pavement construction temperatures (e.g., 150 to 180° C.), generally have lower flashpoints than that of asphalt, and may be prone to higher loss of performance due to oxidative aging.

The polymerized oils and blends described herein are not only viable substitutes for mineral oil, but have also been shown to extend the UTI of asphalts to a greater degree than other performance modifiers, therefore providing substantial value to asphalt manufacturers. The observed increase in UTI using the polymerized oils described herein is a unique property not seen in other asphalt softening additives such as asphalt flux, fuel oils, or flush oils. Typically one grade improvement in either the SHRP Performance Grading (PG) specification or the Penetration grading system used in many countries is achieved with approximately 2 to 3 wt % of the polymerized oil by weight of the asphalt. For example, the increase in UTI seen for approximately 3% by weight addition of the polymerized oil can be as much as 4° C., therefore providing a broader PG modification range such that the lower end temperature can be lower without sacrificing the higher end temperature.

Rejuvenation of Aged Bituminous Material

Asphalt "ages" through a combination of mechanisms, mainly oxidation and volatilization. Aging increases asphalt modulus, decreases viscous dissipation and stress relaxation, and increases brittleness at lower performance temperatures. As a result, the asphalt becomes more susceptible to cracking and damage accumulation. The increasing usage of recycled and reclaimed bituminous materials which contain highly aged asphalt binder from sources such as reclaimed asphalt pavements (RAP) and recycled asphalt shingles (RAS) have created a necessity for "rejuvenators" capable of partially or completely restoring the rheological and fracture properties of the aged asphalt. Aging of asphalt has also been shown to increase colloidal instability and phase incompatibility, by increasing the content of high molecular weight and highly polar insoluble "asphaltene" fraction which may increasingly associate. The use of the polymerized oil described herein are particularly useful for RAP and RAS applications. The polymerized oil described in this document act as a compatibilizer of the asphalt fractions, especially in aged and oxidized asphalt, resulting in a balanced and stable asphalt binder with restored performance and durability.

During plant production the asphalt is exposed to high temperatures (usually between 150 to 190° C.) and exposure to air during which significant oxidation and volatilization of lighter fractions can occur leading to an increase in modulus and a decrease in viscous behavior. The aging process is simulated using a Rolling Thin Film Oven (ASTM D2872) during which a rolling thin film of asphalt is subjected a jet of heated air at about 163° C. for about 85 minutes. The rheological properties are measured before and after the aging procedure using a Dynamic Shear Rheometer following ASTM D7175 using the ratio of the $|G^*|/\sin\delta$ after to before aging, in which $G^*$ is the complex modulus and $\delta$ is the phase angle. The larger the ratio of the ($|G^*|/\sin\delta$) alter aging to the ($|G^*|/\sin\delta$) before aging, the higher the effect of oxidative aging and volatilization on the tested asphalt.

Using this procedure it is shown that asphalts treated with the polymerized oil or blends thereof described in this invention have a lower ratio, thus showing a lower tendency for change in rheological properties as a result of oxidative aging and volatilization.

Accordingly, the polymerized oils described herein have been shown to be capable of rejuvenating aged asphalt binder, and modify the rheological properties of the asphalt binder. As a result, small dosages of the polymerized oil can be used to incorporate high content of aged recycled asphalt material into pavements and other applications resulting in significant economic savings and possible reduction in the environmental impact of the pavement through reduction of use of fresh resources.

Notably, the polymerized oil described herein may be used to make an emulsion for use in asphalt rejuvenation applications. The emulsion comprises an oil phase and an aqueous phase. The oil phase comprises the polymerized oil described herein and may further comprise of asphalt binder and other additives and modifiers, wherein the polymerized oil is about 0.1 to 100 wt % of the oil phase. The aqueous phase often comprises a surfactant and may further comprise natural and synthetic polymers (such as Styrene Butadiene Rubber and latex) and/or water phase thickeners.

The oil phase makes up about 15 to 85 wt % of the emulsion with the aqueous phase making up the remaining balance. It is understood by those skilled in the art that emulsions are sometimes further diluted with water at time of application, thus the effective oil phase content of the diluted emulsion may be reduced indefinitely.

Further contemplated herein is a method comprising applying the emulsion to the surface of an existing pavement or applying the emulsion to treat RAS or RAP and further mixing the treated RAS or RAP with virgin asphalt thereby obtaining a rejuvenated asphalt blend.

The emulsion may also be used as part of a cold patching material, a high performance cold patch or cold mix application that contains recycled asphalt thereby obtaining treated RAS or RAP.

In other aspects, the emulsion may be used for cold-in-place recycling of milled asphalt pavements or hot-in-place recycling of milled asphalt pavements.

Elastomeric Thermoplastic Polymer Compatibilization in Asphalt

Asphalt is often modified with thermoplastic elastomeric and plastomeric polymers such as Styrene-Butadiene-Styrene (SBS) to increase high temperature modulus and elasticity, to increase resistance to heavy traffic loading and toughening the asphalt matrix against damage accumulation through repetitive loading. Such polymers are usually used at 3 to 7 wt % dosages in the asphalt and high shear blended into asphalt at temperatures exceeding 180° C. and allowed to "cure" at similar temperatures during which the polymer swells by adsorption of lighter fractions in the asphalt until a continuous volume phase is achieved in the asphalt.

The volume phase of the fully cured polymer will be affected by degree of compatibility of the polymer in the asphalt and the fineness of the dispersed particles, resulting in an increased specific area and enhanced swelling potential through increase of the interface surface between asphalt and polymer.

The polymerized oils described in this document have been shown to be capable of further compatibilizing elastomeric polymer in the asphalt, when the oil is added and blended into the asphalt before the incorporation of the polymer, or the curing stage. This will be especially effective in asphalt binders that are not very compatible with the elastomeric polymer. Furthermore, the oil may contribute to the lighter fractions that swell the polymers during the curing period.

Warm Mix Additives and Asphalt

In recent years an increasing portion of pavements are use produced using what is commonly referred to as "warm mix additives" to produce "warm mix" asphalt pavements. Warm mix pavements can be produced and compacted at lower production temperatures, require less compaction effort to achieve target mixture density, and as a result can retain the properties necessary for compaction at lower temperature enabling an increase in the maximum haul distance of the asphalt mixture from the plant to the job site.

The different mechanisms through which warm mix additives may include increased lubrication of aggregates during asphalt mixture compaction, reduction of the binder viscosity at production temperatures, and better coating and wettability of the aggregates. Thus a diverse range of chemicals and additives may exhibit one or more of the properties attributed to warm mix additives when added to an asphalt mixture.

The polymerized oils described herein can be used as a warm mix additive and/or compaction aid, to achieve a number of the benefits expected from a warm mix additive including minimum decreasing production and construction temperatures through increase in aggregate lubrication and aggregate wettability. In such an application the additive would be used at dosages preferably in the range of between about 0.1 and 2% by weight of the bitumen.

EXAMPLES

The following examples are presented to illustrate the present invention and to assist one of ordinary skill in making and using same. The examples are not intended in any way to otherwise limit the scope of the invention.

Experimental Method

A charge of precipitated sulfur (mass ranges between 6.5 grams to 56.5 grams) is added to a 1 liter round bottom flask containing 650 grams of biorenewable oil. The reactor is then heated to the target reaction temperature using a heating mantle, taking care not to over shoot the target temperature by more than 5° C. The reaction mixture is agitated using a motorized stirrer with a stir shaft and blade. The reaction is continuously sparged with nitrogen at 2-12 standard cubic feet per hour (SCFH). A condenser and receiving flask is used to collect any distillate.

It is noted that the reaction will create foam around 110-115° C. when the sulfur melts into the oil. The reaction is monitored using GPC to measure the oligomer content and distribution, and viscosity is measured at 40° C. following ASTM D445. The reaction is considered complete when the desired oligomer content and Polydisperity Index has been achieved. The reactor is then cooled to 60° C.

Example 1

Cationic Emulsion of Ashpalt Containing Sulfurized Soybean Oil Blend #1

A modified asphalt binder comprising:
95.0% by weight of neat asphalt binder graded as PG64-22 (PG-64.88-24.7)
5.0% by weight of a blend having:
59.0% by weight of a sulfurized soybean oil reacted with 7.0% by weight of elemental sulfur at 160° C. for 19 hrs under a Nitrogen sparge. This resulted in a modifier with 70.8% oligomer
41.0% by weight of straight soybean oil
Blend of the sulfurized oil and the soybean oil had about 45.6% oligomer content and a PDI of approximately 3.95.

The modifier was blended into the asphalt after the binder had been annealed at 150° C. for 1 hour.

The modified asphalt was used as the oil component to make a latex modified cationic rapid set emulsion. The oil phase was 65.0% by total weight of the emulsion. The aqueous phase consisted of the following components:

0.70% by weight of emulsion of a cationic quick set imidazoline emulsifier (Anova 1620 manufactured by Cargill)

2.0% by weight of emulsion of Latex (UltraPave)

HCl in sufficient content to achieve a pH of 2.6

Incorporation of the polymerized oil in this formulation enables use of this product in rejuvenating surface applications used for pavement maintenance and preservation, especially rejuvenating scrub seal applications, and rejuvenating fog seals and sand seals. Furthermore, the emulsified solution enables use in low unheated paving applications (known as "Cold Mixes") such as cold in place recycling, cold patch, and cold mix pavement layers. Use of rapid-setting surfactant formulations, such as that used in this example, enable rapid buildup of aggregate retention and traffic resistance. As a result, in ideal conditions the road can be opened to traffic within 30 minutes to an hour of the application. The content of polymerized oil will vary depending on the grade of the base oil and the final desired properties.

Example 2

Cationic Emulsion of Asphalt Containing a Sulfurized Soybean Oil and Recovered Corn Oil Blend This example demonstrates the use of another polymerized oil that may be used in applications similar to that described in Example #1.

A modified asphalt binder comprising:

95.0% by weight of neat asphalt binder graded as PG64-22 (PG 64.88-24.7)

5.0% by weight of a blend having:
  59.0% by weight of a sulfurized soybean oil reacted with 7.0% by weight of elemental sulfur at 160° C. for 19 hrs under a Nitrogen sparge. This resulted in a modifier with 70.8% oligomer
  41.0% by weight of recovered corn oil
  Blend of the sulfurized oil and the recovered corn oil had about 46.31% oligomer content and a PDI of approximately 4.40.

The modifier was blended into the asphalt after the binder had been annealed at 150° C. for 1 hour.

The modified asphalt was used as the oil phase in a latex modified cationic rapid set emulsion. The oil phase was 65.0% by total weight of the emulsion. The aqueous phase consisted of the following components:

0.70% by weight of emulsion of a cationic quick set imidazoline emulsifier (Anova 1620 manufactured by Cargill)

2.0% by weight of emulsion of Latex (UltraPave)

HCl in sufficient content to achieve a pH of 2.6

The content of Polymerized Oil will vary depending on the grade of the base oil and the final desired properties.

Example 3

Cationic Emulsion of Asphalt Containing a Sulfurized Soybean Oil Blend #2

This example demonstrates the use of another polymerized oil that may be used in applications similar to that described in Example #1.

A modified asphalt binder comprising:

95.0% by weight of neat asphalt binder graded as PG64-22 (PG 64.88-24.7)

5.0% by weight of a blend having:
  14.5% by weight of a sulfurized soybean oil reacted with 7.0% by weight of elemental sulfur at 160° C. for 19 hrs under a Nitrogen sparge. This resulted in a modifier with 70.8% oligomers
  85.5% by weight of straight soybean oil
  Blend of the sulfurized oil and the straight soybean oil had about 16.59% oligomer content and a PDI of approximately 2.44.

The modifier was blended into the asphalt after the binder had been annealed at 150° C. for 1 hour.

The modified asphalt was used as the oil phase in a latex modified cationic rapid set emulsion. The oil phase was 65.0% by total weight of the emulsion. The aqueous phase consisted of the following components:

0.70% by weight of emulsion of a cationic quick set imidazoline emulsifier (Anova 1620 manufactured by Cargill)

2.0% by weight of emulsion of Latex (UltraPave)

HCl in sufficient content to achieve a pH of 2.6

The content of Polymerized Oil will vary depending on the grade of the base oil and the final desired properties.

Example 4

Anionic Emulsion of Asphalt Containing Sulfurized Soybean Oil Blend #2

A modified asphalt binder comprising:

97.5% by weight of neat asphalt binder graded as PG58-28

2.5% by weight of the polymerized oil of Example #3.

The modifier was blended into the asphalt after the binder had been annealed at 150° C. for 1 hour.

The modified asphalt was used as the oil phase in a latex modified anionic rapid set emulsion. The oil phase was 67% by total weight of the emulsion. A rapid setting anionic aqueous phase, typically used for RS2-P type emulsions was utilized. The emulsion can be used in rapid setting applications such as chip seals, fog seals, and sand seals. The content of Polymerized Oil will vary depending on the grade of the base oil and the final desired properties.

Example 5

Cationic Emulsion of Sulfurized Soybean Oil Blend #1

An oil in water cationic emulsion was made using the polymerized oil of Example #1 as the "oil phase." The oil phase was 50% by total weight of the emulsion. The aqueous phase consisted of the following components:

0.5% by weight of emulsion of a cationic rapid set emulsifier (AA-89, manufactured by MeadWest Vaco).

HCl in sufficient content to achieve a pH of 2.0-2.2

This formulation is suitable for rejuvenating surface applications used for pavement maintenance and preservation, especially rejuvenating fog seals and sand seals. Furthermore, the emulsified solution enables use in low unheated paving applications (known as "Cold Mixes") such as cold in place recycling, cold patch, and cold mix pavement layers. Use of rapid-setting surfactant formulations, such as that used in this example, enable rapid buildup of aggregate retention and traffic resistance.

Example 6

Cationic Emulsion of Sulfurized Soybean Oil Blend #2

This example demonstrates the use of a quick setting emulsifier in place of a rapid setting emulsifier, for solutions that may be used in applications similar to that described in Example #5.

An oil in water cationic emulsion was made using the following polymerized oil as the "oil phase":
- 59.0% by weight of a sulfurized soybean oil reacted with 7.0% by weight of elemental sulfur at 160° C. for 19 hrs under a Nitrogen sparge. This resulted in a modifier with 70.8% oligomer
- 41.0% by weight of straight soybean oil
- Blend of the sulfurized oil and the soybean oil had about 45.6% oligomer content and a PDI of approximately 3.95.

The oil phase was 50% by total weight of the emulsion. The aqueous phase consisted of the following components:
- 0.5% by weight of emulsion of a cationic quick set imidazoline emulsifier (Anova 1620 manufactured by Cargill)
- HCl in sufficient content to achieve a pH of 2.0-2.2

Example 7

Cationic Emulsion of Sulfurized Soybean Oil Blend #3

This example demonstrates the use of another polymerized oil, for solutions that may be used in applications similar to that described in Example #5.

An oil in water cationic emulsion was made using the following polymerized oil as the "oil phase":
- 14.5% by weight of a sulfurized soybean oil reacted with 7.0% by weight of elemental sulfur at 160° C. for 19 hrs under a Nitrogen sparge. This resulted in a modifier with 70.8% oligomers
- 85.5% by weight of straight soybean oil
- Blend of the sulfurized oil and the straight soybean oil had about 17% oligomer content The oil phase was 50% by total weight of the emulsion. The aqueous phase consisted of the following components:
- 0.5% by weight of emulsion of a cationic quick set imidazoline emulsifier (Anova 1620 manufactured by Cargill)
- HCl in sufficient content to achieve a pH of 2.0-2.2

Example 8

Cationic Emulsion of Sulfurized Soybean Oil and Recovered Corn Oil Blend #1

This example demonstrates the use of another polymerized oil, for solutions that may be used in applications similar to that described in Example #5.

An oil in water cationic emulsion was made using the following polymerized oil as the "oil phase":
- 59.0% by weight of a sulfurized soybean oil reacted with 7.0% by weight of elemental sulfur at 160° C. for 19 hrs under a Nitrogen sparge. This resulted in a modifier with 70.8% oligomer
- 41.0% by weight of recovered corn oil
- Blend of the sulfurized oil and the recovered corn oil had about 46.31% oligomer content and a PDI of approximately 4.40.

The oil phase was 50% by total weight of the emulsion. The aqueous phase consisted of the following components:
- 0.5% by weight of emulsion of a cationic quick set imidazoline emulsifier (Anova 1620 manufactured by Cargill)
- HCl in sufficient content to achieve a pH of 2.0-2.2

Example 9

Cationic Emulsion of Sulfurized Soybean Oil and Recovered Corn Oil Blend #2

This example demonstrates the use of another polymerized oil, for solutions that may be used in applications similar to that described in Example #5.

An oil in water cationic emulsion was made using the following polymerized oil as the "oil phase":
- 14.5% by weight of a sulfurized soybean oil reacted with 7.0% by weight of elemental sulfur at 160° C. for 19 hrs under a Nitrogen sparge. This resulted in a modifier with 70.8% oligomers
- 85.5% by weight of recovered corn oil
- Blend of the sulfurized oil and the recovered corn oil had about 16.03% oligomer content and a PDI or approximately 3.28.

The oil phase was 50% by total weight of the emulsion. The surfactant phase consisted of the following components:
- 0.5% by weight of emulsion of a cationic quick set imidazoline emulsifier.
- HCl in sufficient content to achieve a pH of 2.0-2.2.

Example 10

Cationic Emulsion of Sulfurized Soybean Oil and Recovered Corn Oil Blend #1

This example demonstrates the use of a triethylamine (TEA) as an emulsifier, utilizing the acid functionality of the recovered corn oil (AV of approximately 30 mg KOH/g) to produce a surfactant. The resulting product may be used in applications similar to that described in Example #5.

An oil in water cationic emulsion was made using the following polymerized oil as the "oil phase". The oil phase was 50% by total weight of the emulsion.
- 59.0% by weight of a sulfurized soybean oil reacted with 7.0% by weight of elemental sulfur at 160° C. for 19 hrs under a Nitrogen sparge. This resulted in a modifier with 70.8% oligomer
- 41.0% by weight of recovered corn oil
- Blend of the sulfurized oil and the recovered corn oil had about 46.31% oligomer content and a PDI of approximately 4.40.
- TEA was added at 0.75% by weight of the polymerized oil and blended into the oil phase

Example 11

Cutback of Sulfurized Soybean Oil Blend using Soy Methyl Ester

A "cutback" formulation was made using Soy Methyl Ester and a polymerized oil. This product is suitable for use in low temperature and unheated paving applications (known as "Cold Mixes") such as cold in place recycling, cold patch, and cold mix pavement layers.

The cutback contained the following material, blended at 60° C.:

- 59.0% by weight of a sulfurized soybean oil reacted with 7.0% by weight of elemental sulfur at 160° C. for 19 hrs under a Nitrogen sparge. This resulted in a modifier with 70.8% oligomer
- 8.5% by weight of straight soybean oil
- 32.3% by weight of Soy Methyl Ester The resulting cutback blend of the sulfurized oil had the following properties:

- Oligomer content of about 50.1%
- PDI of approximately 4.12
- Density at 25° C. of 0.934 g/ml
- Viscosity at 40° C. of 90.4 cSt
- Viscosity at 25C of 150 cSt

The invention claimed is:

1. An emulsion for use in asphalt rejuvenation applications, comprising:
   (a) an oil phase comprising a polymerized oil comprising a starting oil material crosslinked with a sulfur-containing compound, the polymerized oil comprising
      i. a polymeric distribution having about 2 to about 80 wt % oligomer content;
      ii. a polydispersity index ranging from about 1.0 to about 5.0; and
      iii. sulfur content less than about 8 wt %; and
   (b) an aqueous phase comprising a surfactant.

2. The emulsion of claim 1, wherein the oil phase further comprises a biorenewable oil, a previously modified oil, or a functionalized oil.

3. The emulsion of claim 1, wherein the aqueous phase further comprises polymers and/or thickeners.

4. The emulsion of claim 1, wherein the starting oil material is isolated from plants, animals, or algae.

5. The emulsion of claim 4, wherein the starting oil material is selected from the group consisting of palm oil, sunflower oil, corn oil, soybean oil, canola oil, rapeseed oil, linseed oil, tung oil, castor oil, tall oil, cottonseed oil, peanut oil, safflower oil, corn stillage oil, and combinations, distillates, and crude streams thereof.

6. The emulsion of claim 5, wherein the polymerized oil is an alkyl ester of one or more of the starting oil materials.

7. The emulsion of claim 4, wherein the starting oil material is selected from the group consisting of animal fat, lecithin (phospholipids), and combinations, distillates, and crude streams thereof.

8. The emulsion of claim 1, wherein the starting oil material is free fatty acids and distillate streams thereof.

9. The emulsion of claim 1, wherein the starting oil material is selected from the group consisting of methyl, ethyl, propyl, and butyl esters, and combinations thereof.

10. The emulsion of claim 1, wherein the starting oil material is selected from diol esters, triol esters, and mixtures thereof.

11. The emulsion of claim 1, wherein the starting oil material has been previously modified.

12. The emulsion of claim 1, wherein the starting oil material is selected from the group consisting of triacylglycerides, diacylglycerides, monoacylglycerides, and combinations thereof.

13. The emulsion of claim 1, wherein the starting oil material comprises recovered corn oil.

14. The emulsion of claim 1, wherein the starting oil material comprises a partially hydrogenated oil.

15. The emulsion of claim 1, wherein the oil phase further comprises an asphalt binder.

16. The emulsion of claim 15, wherein the oil phase comprises about 0.1 to about 100 wt % polymerized oil.

17. The emulsion of claim 1 wherein the oil phase makes up about 15-85 wt % of the emulsion.

18. A method comprising applying the emulsion of claim 1 to an existing pavement surface.

19. The emulsion of claim 1, wherein the sulfur-containing compound is elemental sulfur.

20. The emulsion of claim 19, wherein the crosslinking comprises heating to about 130° C. to about 250° C.

21. The emulsion of claim 1, wherein the crosslinking comprises heating to about 130° C. to about 220° C.

22. The emulsion of claim 1, wherein the crosslinking comprises heating to about 160° C. to about 200° C.

23. The emulsion of claim 1, wherein the sulfur content is 0.01 wt % to 8 wt %.

24. A method comprising applying the emulsion of claim 1 to treat recycled asphalt shingles (RAS) or recycled asphalt pavement (RAP) and further mixing the treated RAS or RAP with virgin asphalt thereby obtaining a rejuvenated asphalt blend.

25. A method comprising applying the emulsion of claim 1 as part of a cold patching material, a high performance cold patch or cold mix application that contains recycled asphalt thereby obtaining treated RAS or RAP.

* * * * *

UNITED STATES PATENT AND TRADEMARK OFFICE
CERTIFICATE OF CORRECTION

PATENT NO. : 10,316,192 B2
APPLICATION NO. : 15/715741
DATED : June 11, 2019
INVENTOR(S) : Todd L. Kurth et al.

Page 1 of 1

It is certified that error appears in the above-identified patent and that said Letters Patent is hereby corrected as shown below:

On the Title Page

In Column 2, item (56) References Cited, under "U.S. PATENT DOCUMENTS", Line 6, after "Butler", insert -- et al. --.

In the Specification

In Column 3, Line 19, delete "baaed" and insert -- based --, therefor.

In Column 3, Line 58, delete "fictionalized" and insert -- functionalized --, therefor.

In Column 4, Line 14, delete "molien" and insert -- molten --, therefor.

In Column 4, Line 62, delete "evert more-" and insert -- even more --, therefor.

In Column 5, Line 2, delete "leas" and insert -- less --, therefor.

In Column 5, Line 12, delete "end" and insert -- and --, therefor.

In Column 5, Line 15, delete "technique." and insert -- techniques. --, therefor.

In Column 13, Line 17, delete "25C" and insert -- 25°C. --, therefor.

In the Claims

In Column 14, Line 24, in Claim 17, after "claim 1", insert -- , --.

Signed and Sealed this
First Day of October, 2019

Andrei Iancu
*Director of the United States Patent and Trademark Office*